(12) United States Patent
Toman (10) Patent No.: US 8,474,668 B2
(45) Date of Patent: Jul. 2, 2013

(54) WEARABLE HOLDERS AND CONTAINERS

(76) Inventor: Joshua Mathew Toman, Charlottesville, VA (US)

( * ) Notice: Subject to any disclaimer, the term of this patent is extended or adjusted under 35 U.S.C. 154(b) by 1213 days.

(21) Appl. No.: 12/175,445

(22) Filed: Jul. 17, 2008

(65) Prior Publication Data

US 2009/0020571 A1    Jan. 22, 2009

Related U.S. Application Data

(60) Provisional application No. 60/950,406, filed on Jul. 18, 2007.

(51) Int. Cl.
*A45C 13/30* (2006.01)
*A45F 5/00* (2006.01)

(52) U.S. Cl.
USPC .......................... 224/219; 224/222; 224/267

(58) Field of Classification Search
USPC .................. 224/219, 222, 267, 255; 206/538
See application file for complete search history.

(56) References Cited

U.S. PATENT DOCUMENTS

| | | | | |
|---|---|---|---|---|
| 1,594,215 A | * | 7/1926 | Sides ........................... | 206/371 |
| 1,609,481 A | * | 12/1926 | McCarthy et al. ............ | 224/219 |
| 2,953,180 A | * | 9/1960 | Kyles ........................... | 269/54.5 |
| 3,202,331 A | * | 8/1965 | McKinstrie ................... | 224/221 |
| 5,127,545 A | * | 7/1992 | French .......................... | 221/102 |
| 5,242,076 A | * | 9/1993 | Gibilisco ...................... | 220/525 |
| 5,747,084 A | * | 5/1998 | Cochran et al. ............... | 426/120 |
| 6,360,928 B1 | * | 3/2002 | Russo ........................... | 224/218 |
| 6,530,509 B1 | * | 3/2003 | Davis ........................... | 224/219 |
| 6,932,214 B1 | * | 8/2005 | Zimet ........................... | 206/217 |
| 7,942,293 B2 | * | 5/2011 | Lawrence et al. ............. | 224/218 |
| 2004/0251285 A1 | * | 12/2004 | O'Neill ......................... | 224/221 |
| 2008/0223892 A1 | * | 9/2008 | Hamilton ...................... | 224/587 |

FOREIGN PATENT DOCUMENTS

GB    2118142 A    * 10/1983

* cited by examiner

*Primary Examiner* — Nathan J Newhouse
*Assistant Examiner* — Lester L Vanterpool
(74) *Attorney, Agent, or Firm* — William D. Hare; McNeely, Hare & War LLP

(57) ABSTRACT

A wearable food holder includes a container portion having multiple walls defining an interior volume; a tray portion, the tray portion being movable relative to the container portion from a closed position to an open position to access the interior volume; one or more spikes, the spikes being positioned within the interior volume of the container portion when the tray portion is in a closed position; and a mounting means for mounting the food holder to an article for wearing by a person.

22 Claims, 8 Drawing Sheets

WEARABLE HOLDERS AND CONTAINERS

RELATED APPLICATIONS

This application claims priority from provisional patent application No. 60/950,406, filed on Jul. 18, 2007, the contents of which are incorporated herein in their entirety by reference.

TECHNICAL FIELD

The field of the invention generally relates to body mounted holders and containers for carrying small portion, high energy food substances and supplements.

BACKGROUND

During endurance sports and events, as well as during military operations, there exists a need to provide essential nutrition and rehydration to optimize physical performance. Many attempts have been made to provide nutrition in a convenient manner. For example, the ubiquitous canteen worn by Soldiers on their belts can be considered a precursor to the CamelBak® fluid holder worn on the back of cyclists. The CamelBak® has a tube that runs from the bladder to the cyclist's mouth so the cyclist never needs to stop bicycling to get fluids. Rather than developing similar innovative methods of carrying food substances, innovation in this area focuses on reducing the size of the food while increasing nutrition and/or calories per weight. This one-dimensional innovation relies on traditional means of carrying the food, such as pockets and bags, or else forgoes nutrition and supplementation.

The electronics industry has developed means for wearing or carrying radios, telephones, music players, and calculators. The golfing industry has developed numerous products for holding golf balls, golf tees, divots, and other golf paraphernalia. Similarly, the hunting industry has developed wearable means for carrying bullets, arrows and the like. For example, U.S. Design Pat. No. 496,155 discloses an arm band carrier that holds devices, such as a cell phone. The arm band carrier includes an open pocket for the cell phone, two side tubular pockets for holding articles such as pens, and a pouch with a flap to close the pouch. U.S. Pat. No. 5,368,042 discloses a forearm mounted biofeedback device for monitoring muscular movement. The device includes a strap upon which are mounted electrodes, a ground, an electronic amplifier, and an indicator.

U.S. Pat. No. 4,069,954 discloses a wrist band for carrying tees and golf ball position markers. The wrist band includes three loops that have a channel to receive golf tees. The wrist band also includes slotted pouches into which position markers can be inserted with the disc or head under the fabric and the pin sticking out through the slot in the fabric. U.S. Pat. No. 5,365,609 discloses a golf glove with a holder for golf tees and ball markers. The glove includes two layers for holding the tees and markers. The inner layer includes channels having openings that receive the golf tees. The outer layer includes a slotted pocket having a slot through which the tang extends. U.S. Pat. No. 6,173,451 discloses a golf accessory wrist band that includes a pouch to hold a divot tool, pouches to hold golf tees, and a retaining member to hold position markers. The retaining member includes openings into which the shaft of the position marker is inserted.

U.S. Pat. No. 6,374,719 discloses a band with a resilient block having apertures for receiving ammunition, such as lead pellets. U.S. Pat. No. 5,934,531 discloses a leg mounted quiver for holding arrows for an archer. The quiver includes a lower compartment that receives the sharp end of the arrows and an attachment portion that slides into a mounting bracket. U.S. Pat. No. 5,271,176 discloses an arm mounted bullet holder. The holder is a closed band that includes an inner foam rubber layer and an outer fabric layer. The holder includes openings into which the bullets can be inserted. U.S. Pat. No. 5,967,391 discloses a forearm mounted game call holder. The holder includes a band that encircles the arm and on which are attached securing loops that retain the game call. U.S. Pat. No. 3,273,766 discloses a wrist article retaining device that includes a holder that has a base that fits, and can slide, within a slotted channel. The holder includes a pair of arms that clamp around an article such as a flashlight to retain the article to the holder.

Other prior art containers include pill containers by Apothecary Products, Inc. U.S. Pat. No. 6,000,546 discloses containers have an openable lid that is opened to access pills held within a container. The person accessing the pills within the container must either rotate the container to empty the contents or reach in to pull out the contents. Some of the products provided by this company include removable compartments that can be separated from the remainder of the container. In addition, some of the products may be attached to a key chain. However, none of the products appear to be either wearable or openable to easily access the contents of the container. What is meant by the latter is that to access the contents of the container of the prior art, one opens a lid that covers one surface of the container. The person must then reach into the compartment and pull the pill up and out to obtain the compartment's contents rather than easily access the pill and pull it out.

The above described prior art does not, however, describe containers or holders that can be mounted to the body or equipment and used to carry food, snacks, supplements, or medication.

SUMMARY

In one general aspect, a wearable food holder includes a container portion having multiple walls or movable partitions defining an interior volume; a tray portion, the tray portion being movable relative to the container portion from a closed position to an open position to access the interior volume; one or more spikes, the spikes being positioned within the interior volume of the container portion when the tray portion is in a closed position; and a mounting means for mounting the food holder to an article for wearing by a person.

Embodiments of the wearable food holder may include one or more of the following features. For example, the one or more spikes may extend from the container portion or the tray portion.

The container portion may include a pair of slots configured to receive the tray portion to mount the tray portion to the container portion. The pair of slots on the container portion may have a shape that mates with edges of the tray portion to allow the tray portion to slide into the container portion in only one orientation.

The tray portion may be connected to the container portion with a hinge.

The mounting means may include one or more openings configured to receive a strap or band. The mounting means may include a slotted channel formed by pair of edges that define a channel that can be accessed through a slot. The mounting means may include one or more of a clip, pin, hook and loop straps, a hook or loop section, or a round ball extending from the container portion to be forcibly inserted through a smaller hole in a band.

The food holder may be worn on one or more of a wrist band, arm band, leg band, belt, piece of clothing, hydration pack, and bottle or container. The food held in the food holder may be a Clif Bar ClifShot® Blok or Lifexpand Lyte'N Go® chewable tablet.

In another general aspect there is provided a method of carrying food in a wearable food holder. The method may include providing a wearable food holder, mounting a piece of food to the one or more spikes, closing the food holder whereby the piece of food is retained within the interior volume of the food holder, and attaching the wearable food holder to one or more of a band, strap, belt or piece of clothing using the mounting means. The wearable food holder may include a container portion having multiple walls defining an interior volume, a tray portion being movable relative to the container portion from a closed position to an open position to access the interior volume, one or more spikes being positioned within the interior volume of the container portion when the tray portion is in a closed position, and a mounting means for mounting the food holder to an article for wearing by a person;

Embodiments of the method may include one or more of the following features. For example, the one or more spikes may extend from the container portion or the tray portion.

The container portion may include a pair of slots configured to receive the tray portion to mount the tray portion to the container portion. The pair of slots on the container portion may have a shape that mates with edges of the tray portion to allow the tray portion to slide into the container portion in only one orientation.

The tray portion may be connected to the container portion with a hinge.

The mounting means may include one or more openings configured to receive a strap or band. The mounting means may include a slotted channel formed by pair of edges that defines a channel that can be accessed through a slot. The mounting means may include one or more of a clip, pin, hook and loop straps, a hook or loop section, or a round ball extending from the container portion to be forcibly inserted through a smaller hole in a band.

In another general aspect, a wearable food holder includes:

a container portion having multiple walls defining an interior volume;

a tray portion, the tray portion being movable relative to the container portion from a closed position to an open position to access the interior volume;

one or more retaining means, the retaining means being positioned within the interior volume of the container portion when the tray portion is in a closed position and being accessible from at least two sides when the tray portion is in an open position; and a mounting means for mounting the food holder to an article for wearing by a person.

The wearable food holder is believed to provide solutions to current problems faced by Soldiers, athletes, and people engaged in outdoor activities, and in so doing improve current capabilities and provide for future capabilities. For example, for Soldiers involved in military operations, the wearable food holder can support (1) safety by providing medications or stimulants; (2) survivability by providing nutrition and supplementation; and (3) sustainability and mission enhancements by decreasing Soldier load. In supporting sustainability and mission enhancement, the Soldier may have increased mobility, and improved command and control by enabling faster resupply and extended operational capabilities. Further, the Soldier may have an improved quality of life in a tactical environment by providing additional meal variations.

The wearable food holder also is believed to provide advantages to other populations, such as those that need nutrition on a short notice. For example, diabetics or dieters may be advantageously provided rapid nutrition to maintain constant blood sugar levels. Similarly, pregnant mothers who may suddenly need nutrition may quickly take advantage of the wearable food holder to keep their energy levels constant.

The details of various embodiments of the invention are set forth in the accompanying drawings and the description below. Other features and advantages of the invention will be apparent from the description, drawings, and claims.

DETAILED DESCRIPTION

Figure 1:
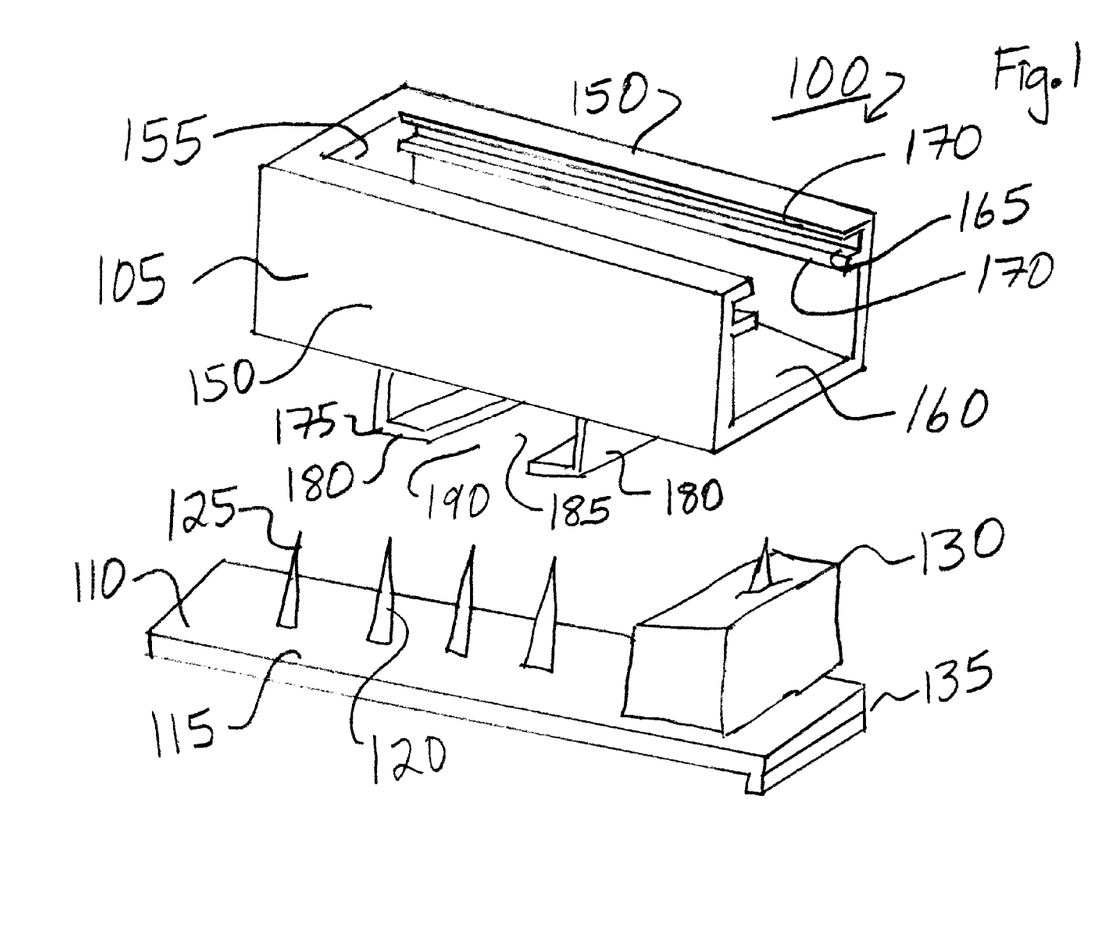
FIG. 1 is a perspective view of one implementation of a wearable food holder.

Referring to FIG. 1, a wearable food holder 100 includes a container portion 105 and a tray portion 110. The tray portion 110 includes a base 115 and prongs or spikes 120 extending from the base that function as a retaining means. The spikes 120 are integrally attached to the base 115, for example through injection molding the spikes and base as one piece, or press-fitting the spikes into openings in the base to form a tight interference fit. The spikes generally have a sharpened tip 125 onto which a food cube 130 can be skewered or impaled. The tray portion 110 is illustrated with a row of generally large spikes 120. In another implementation, the spikes may be replaced with an array of much smaller spikes 120 which only partially enter the food substances or enter just enough to retain the food substance. In yet another implementation, the large or small spikes 120 may be replaced with an adhesive tape or adhesive material that is used to retain the food substance to the tray portion 110. The adhesive may be a part of the packaging for the food substance, or placed on either the tray or food substance each time a food substance is used. If the adhesive is to be in direct contact with the food substance, the adhesive should be suitable as a food contacting material as well as acceptable for ingesting. The spikes 120 or adhesive may be replaced with any other type of retaining means, such as an elastic strap to hold the food substance to the tray portion, retaining pins that fit against the side of the food substance to retain the food substance to the tray portion, a single L-shaped pin that has one leg that snaps over the food substance and the other leg that is mounted to the tray portion, mini-suction cups mounted to the tray portion, etc. Any other retaining means known within the art also is contemplated to retain the food substance to either the tray portion 110 or the food holder in general.

The tray portion 110 also includes a lip 135 or other closing mechanism to retain the tray within the container portion 105. The tray portion 110 can be made from, for example, a plastic or metal material, and may be entirely or partially made of either these materials. For example, the base 115 can be plastic and the spikes 120 can be metal. Although the tray portion 110 is illustrated as being generally rectangular, a variety of shapes are contemplated and within the ability of one of ordinary skill in the art. For example, the trays can be straight, curved, semi-circular, or circular to conform to the various substances held within the food holder 100 as well as the different means of either mounting or wearing the food holder 100. The volume of the food holder 100 also may be specified to conform to industry standards in terms of shape and size.

An advantage provided by the tray portion 110 illustrated herein is that the food substances mounted to the tray portion are easily obtained from the food holder 100. Rather than opening a lid to access a food substance within a container, removing a lid or wall allows the user to access the food substance on the lid or tray. This is convenient because if a user is running or otherwise engaged in a strenuous activity, there is little effort, focus, or attention needed to obtain the food substance because accessing the food substance from the removed tray allows the user to approach the food from at least two to three surfaces—the top, two sides and in some cases a third side. In fact, arguably, the user does not even need to view the tray to manipulate his/her fingers to pull off one of the food substances. In contrast, if a food substance remains within the container, the user must approach the food substance from only one surface, generally the top surface or that surface with is viewable upon opening or removing the lid. This configuration may require more effort, focus or attention to manipulate the food substance to get it out of the food holder. Various lid differentiations can be used to assist the user in locating appropriate food substances from amongst the numerous compartments through different shapes or sizes of the opening tabs, buttons, releases or hinges such as Braille or embossing, etc. The transparency of the trays facilitates assists the user in monitoring consumption of the cubes.

The container portion 105 includes a pair of side walls 150, an end wall 155, and a base wall 160. The side walls 150 each include a slot 165 formed by a pair of edges 170. The slot 165 is sized to receive base 115 of the tray portion 110 with the spikes 120 directed within the container portion 105. To ensure that the base 115 is oriented within the container portion 105 with the spikes directed downward, the slot 165 and the base 115 can be configured to ensure that the base can be inserted within the slot 165 only downwardly with the spikes 120 within the container portion 105. For example, the slot 165 can have an angled configuration and the base 115 can have a negative configuration that functions as a mating angled configuration.

It is contemplated that the tray portion 110 will be available either as a disposable component or a reusable component. For example, food substance suppliers may provide the food substances prepackaged on the tray. A user of the food holder thus would merely need to purchase one or more trays and insert one into the container portion 105. Upon using the contents of the tray, the user discards the tray and puts in another prepackaged tray. For the reusable tray portion 110, the user could purchase the food substances individually packaged or in bulk and manually mount them to the spikes.

In another implementation the tray portion 110 can be configured as a blister pack with each food substance retained within separate, sealed compartments. In use, the tray portion is removed from the food holder, the food substance pushed through a foil or similar backing and then the tray portion is re-inserted into the food holder. The blister pack implementation also can be implemented without the container portion 105 except for the slots 165. The slots 165 may be mounted to a wrist band or other surface such that the tray portion can be mounted to the wrist band.

Although FIG. 1 shows the tray portion 110 being slidably mounted to the container portion 105, other mounting means are contemplated. For example, the tray portion 110 may be mounted to the container portion 105 at a width edge through a pin to form a hinge. In this implementation, the tray portion 110 can be swung open and food cubes removed. In another implementation, the tray portion 110 can be mounted at a length edge with a pin. In other implementations, the tray portion 110 can be formed integrally with the container portion 105 and hinged with a narrower or weaker portion of plastic to allow the tray portion to flex at that portion.

Similarly a variety of opening mechanisms may be used to access the contents of the food holder. Examples include push or pull mechanisms, buttons and tabs, as well as any of the known means for pushing down on the lids to release the lid from the tray and access the contents of the food holder. In these implementations, there may be a single lid or multiple lids to access the contents of the food holder.

In another implementation, the food holder 100 may include permanent or removable dividers between the spikes. With such dividers, the layout of the interior of the food holder can be modified to accommodate different sizes of substances. For example, without dividers a large food substance may be stored but with dividers smaller food substances may be stored in the food holder. If the food holder is two inches in length, using a single divider results in a container that has a pair of contiguous one inch compartments. The dividers may be desirable if the user wishes to separate different types of food substances from each other.

Figures 2, 3, 4:
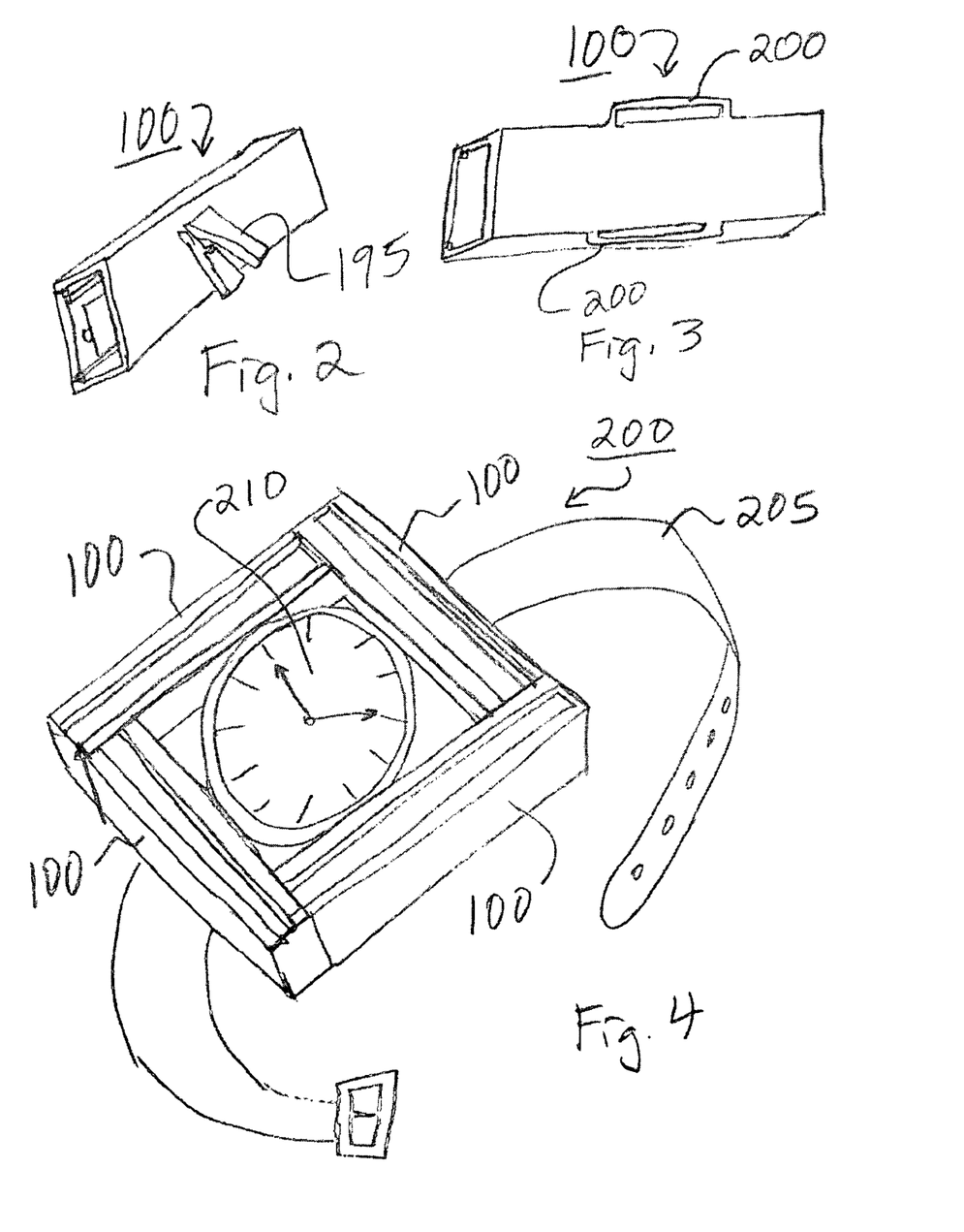
FIG. 2 is a perspective view of a wearable food holder having a clip mounting means.
FIG. 3 is a perspective view of a wearable food holder having a pair of openings used as a mounting means.
FIG. 4 is a perspective view of a watch band implementation of a wearable food holder.

The container portion 105 also includes a mounting means for mounting the food holder 100 to a band, strap, or piece of clothing. For example, the band can be a watch band or a wrist sweat band. As illustrated in FIG. 1, the mounting means is a slotted channel 175 formed by pair of edges 180 that define a channel 185 that can be accessed through a slot 190. The mounting means can be used, for example, to the mount the food holder 100 to a wrist or arm band, or a belt. Referring to FIG. 2, in another implementation, the mounting means can be a clip 195 to mount the food holder 100 to a piece of clothing, such as a shirt. Referring to FIG. 3, the mounting means can be implemented as a pair of openings 197 through which a wrist or arm band can be threaded. Although illustrated as a pair of openings 197, the number of openings can be reduced to a single opening or more than two openings so long as the opening 197 retains the food holder 100 to the clothing, band, or belt that holds the article on the person wearing it. Other suitable mounting means include pins; hook and loop straps (commonly known as Velcro); a hook section attached to integral with the container portions 105 that retains the holder to a loop section on a band, strap or piece of clothing; a round ball extending from the container portion to be forcibly inserted through a smaller hole in a band, etc. For athletic, outdoors, and military purposes, the mounting means as used herein should be capable of staying attached to the individual wearing the food holder 100 in the rough conditions likely to be encountered. The container portion should be capable of securing the cubes inside the tray through locking or retaining mechanisms, to withstand rough conditions or impacts. The device should withstand or protect the cubes from extreme heat and cold, as well as intense UV exposure. For other uses, such as walking or sightseeing, in which the individual wearing the food holder 100 is unlikely to encounter the rough conditions, the mounting means may be less rugged. All versions are at least water resistant but may be waterproof and airtight depending upon the application.

Figure 5:
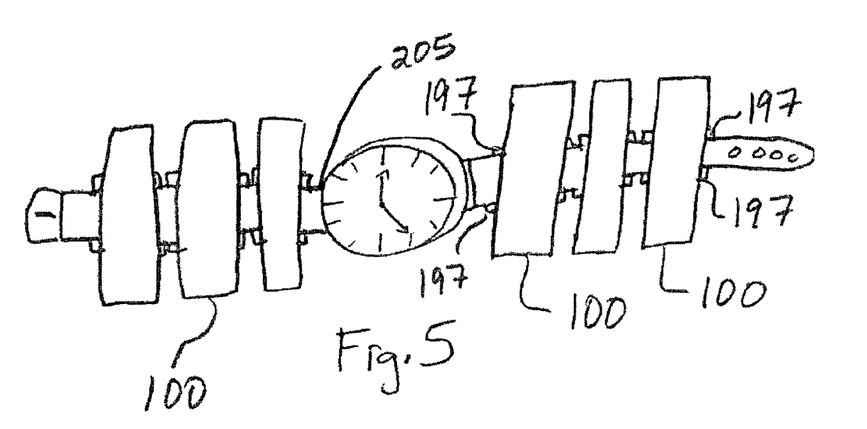
FIG. 5 is a front view of a perpendicularly mounted wearable food holder.

Referring to FIG. 4, the food holder 100 may be individually mounted to a wrist or arm band or may be fabricated such that multiple food holders 100 are connected either integrally or with a connecting means. FIG. 4 illustrates four food holders 100 connected in a generally square configuration 200 and mounted to a watch band 205 such that they surround a watch face 210. In this implementation, two of the food holders 100 may be fabricated without a mounting means and two of the food holders 100 with the mounting means to be mounted to the watch band. As can be contemplated, other configurations are possible. For example, the watch face 210 can be replaced by an openable container that includes one or more spikes with food cubes and be surrounded by the four food holders 100. Such an openable container is illustrated in FIG. 5 but can also be formed from a round plastic base with a round top that is attached to the base with a hinge. Either the base or the top may include spikes to which food cubes can be attached.

Referring to FIG. 5, the food holder 100 may have openings 197 or other attachment means being configured relative to the length dimension of the food holder such that the food holder is mounted perpendicularly to the wrist band 205. An advantage of this orientation is illustrated in FIG. 5 wherein multiple food holders 100 are mounted at a perpendicular orientation to the wrist band. With this configuration, the user is able to carry more food substances than if the length portions of the food holders were to be mounted along the length of the wrist band.

Figure 6:
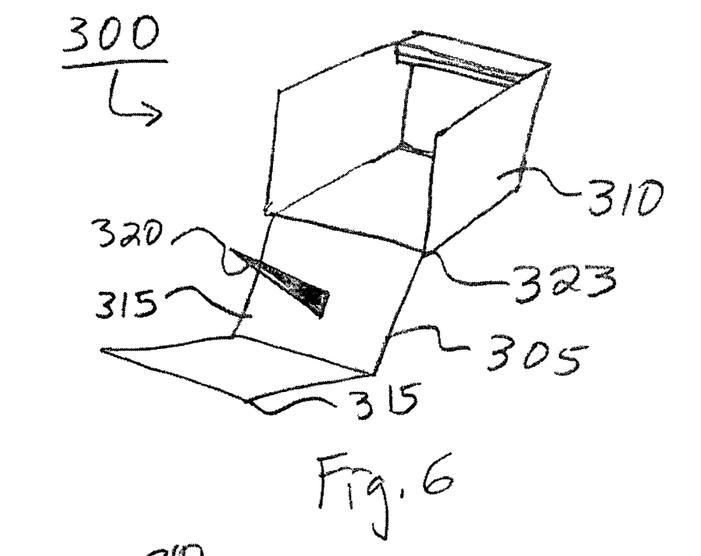
FIG. 6 is a perspective view of one implementation of a wearable food holder.

Referring to FIG. 6, in another implementation, a food holder 300 has a box shape and includes a hinged portion 305 that functions similar to the tray portion 110 of FIG. 1 above, and is openable from a container portion 310. The hinged portion 305 includes at least a pair of walls 315, a spike or prong 320, and a hinge 323. The spike 320 may extend from either wall 315. In another implementation, the spike 320 may be mounted within the container portion 310 from the food holder 300 such that a food cube mounted to the spike may be removed upon opening the hinged portion 305. It should be noted that the food substance can be accessed from multiple directions in these implementation. Similar to the description above with reference to FIG. 1, opening hinged portion 305 allows the user to access at least two sides of the food substance. This allows the user to easily remove the food substance while engaged in activities, optimally without the need to focus on manipulating his/her fingers to pull out the food substance. In general, the implementations relating to FIG. 6 effectively remove the food substance from the food holder when opening the food holder whether the food substance is retainer on the part being moved or the part that remains in place. This contrasts to containers, such as the prior art pill boxes, which function by opening a lid (i.e., a single surface) to access the contents of the container.

Figure 7:
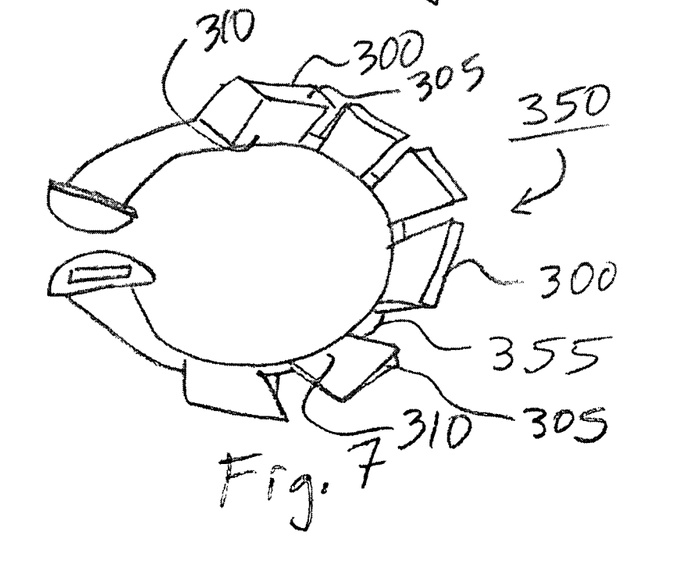
FIG. 7 is a perspective view of the wearable food holder of FIG. 6 mounted to a wearable strap.

Referring to FIG. 7, for a strap implementation 350, the container portion 310 is mounted to a strap 355 in one of the manners described above with respect to FIG. 1. The wearer of the strap can access the food holder 300 while running or otherwise engaged in an activity by merely opening the hinged portion 305 and removing a food cube impaled on the spike 320.

The food holder 300 may be fabricated in a number of manners. For example, the food holder may be fabricated by injection molding with a weakened or narrow section that functions as the hinge 323. The base of the food holder 300 may be formed to include a hook or loop section to mount to a loop or hook section, respectively. Multiple food holders may be integrally formed with the band or strap.

Figure 8:
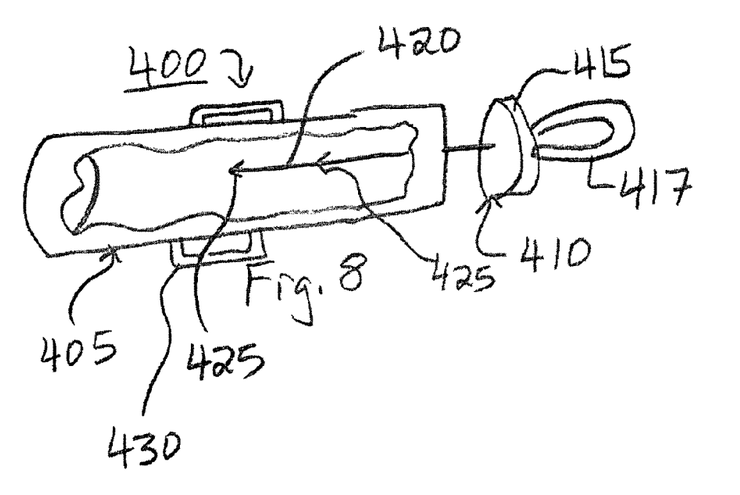
FIG. 8 is a perspective, cut-away view of a cylindrical food holder.

Referring to FIG. 8, a cylindrical food holder 400 includes a cylindrical tube 405 and a spike portion 410 that fits within the cylindrical tube. The spike portion includes an end 415 that fits within the cylindrical tube and seals the tube. The spike portion also may include a handle means 417 for removing the spike portion 410 as well as for mounting the food holder 400 to a key chain, belt loop, etc. A spike 420 extends from the end 415 and is used to retain food substances. The spike 420 may include one or more barbs or protrusions 425 to keep the food substance on the spike when it is being removed from the cylindrical tube. The cylindrical tube 405 also may include a pair of openings 430 to mount the food holder 400 to a wrist band or similar article. The cylindrical food holder may be retained on a wrist band with a Velcro strap or in a pouch. Alternatively, the food holder 400 may include a clip mounted along the length of the tube to retain the food holder to a belt. The clip may be mounted to a pouch and multiple food holders can be retained within the pouch.

Figure 9:
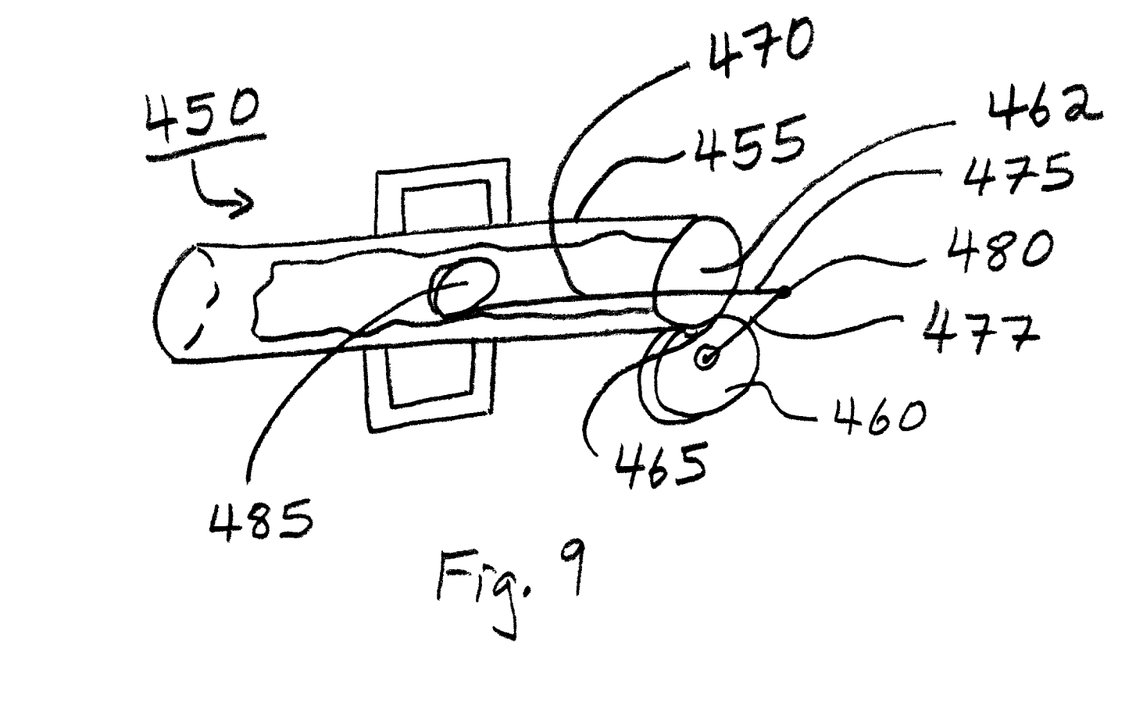
FIG. 9 is a perspective, cut-away view of a second implementation of a cylindrical food holder.

Referring to FIG. 9, in a modification of the cylindrical food holder 400, a cylindrical food holder 450 includes a cylindrical tube 455, a lid 460 to close an opening 462 in the tube, a hinge 465 connecting the lid and cylindrical tube, and a ladle 470. The ladle 470 includes a pair of arms 475, 477 connected at a hinge or joint 480 such that opening the lid 460 pulls the ladle towards opening 462. In this manner, a food substance in the cylindrical tube 455 will be more easily retrieved from the cylindrical tube. The ladle includes a surface 485 on which the food substances rest. The surface 485 can optionally include a spike or prong.

Figure 10:
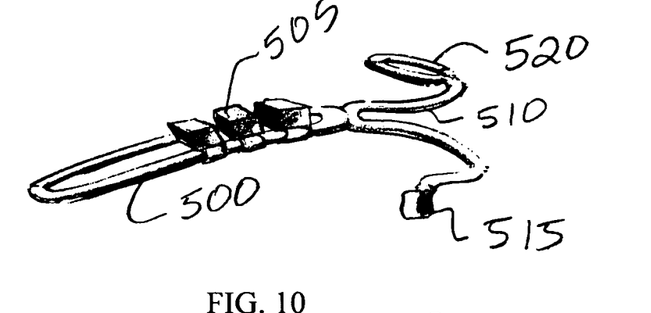
FIG. 10 is a perspective view of a hand mounted food holder.
Figure 11:
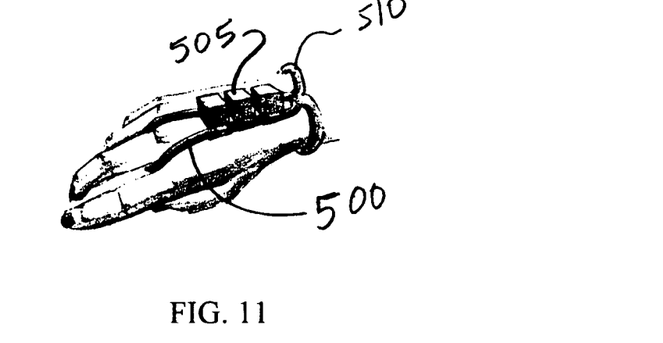
FIG. 11 is a perspective view of the food holder of FIG. 10 mounted on a wearer's hand.
Figure 12:
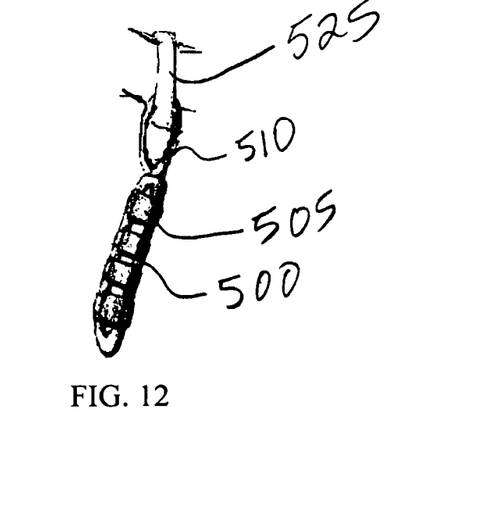
FIG. 12 is a perspective view of the food holder of FIG. 10 mounted on a wearer's belt loop.

Referring to FIGS. 10-12, the food holders described herein may be mounted to a pair or loop of straps 500 that are worn on a user's hand, belt, or other article. For example, the food holders 505 may be slidably mounted to straps 500. The straps may be attached to a second strap 510 that includes a hook 515 and a loop 520 that can be connected to form a closed loop for mounting to articles. As illustrated in FIG. 11, the straps 500 can encircle a finger and the second strap 510 placed around the wearer's wrist and held in place by mounting the hook 515 to the loop 520. Referring to FIG. 12, the second strap 510 can be placed around a belt loop 525 and worn on a pair of shorts or trousers.

Figure 13:
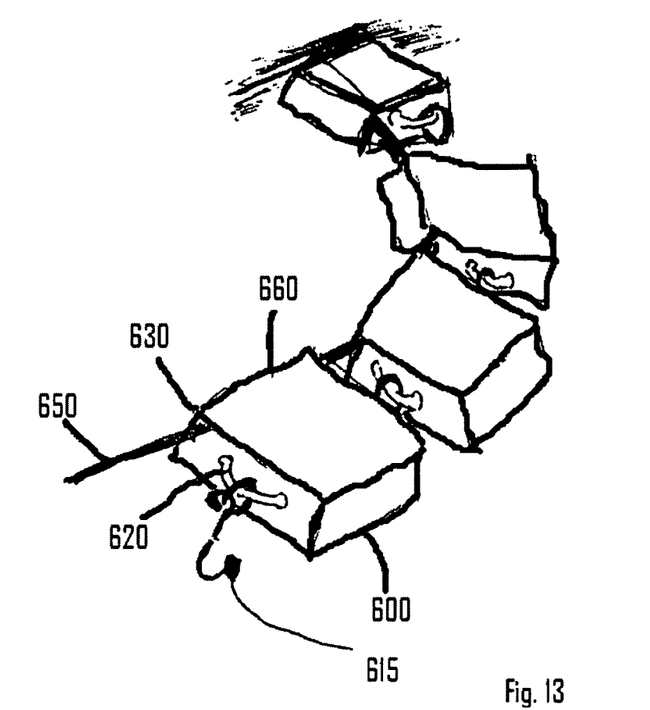
FIG. 13 is a perspective view of a neck mounted food holder.
Figure 14:
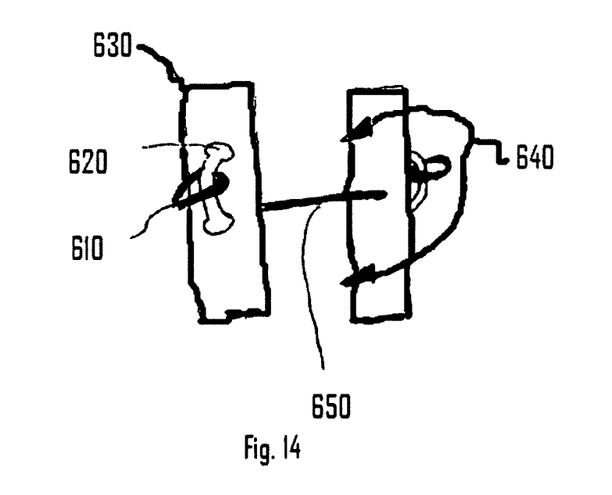
FIG. 14 is a perspective view of the neck mounted food holder of FIG. 13.

Referring to FIGS. 13-14, the food holders described herein may be mounted to a wire, chain, cord or strap 650 that are worn around a user's neck or hand, or other article. For example, the food holders 630 may be mounted to wires 650. The wires may be attached to a tray 630 that includes a bracket 620 and a loop 610 that can be connected to a hook 615 to form a closed chain for mounting to the body or articles. As illustrated in FIG. 13, the chain of trays 600 can encircle a collar or wrist and held in place by mounting the hook 615 to the loop 610. Referring to FIG. 14, the tray surfaces contain spikes 640 or other mounting methods, by placing the cube 660 between the two tray surfaces 630 and pressing the trays into the sides of the cube.

Any type of food substance can be held within the wearable food holders described herein. For example, to provide energy and nutrition during exercising, sporting events, or combat, the food substance can be a high calorie or nutritious energy. One example of such a food substance is the Clif Bar ClifShot® Blok (http://www.clifbar.com/). These Bloks are small enough that they fit easily within the food holders described herein.

FIGS. 1-9 and 13-14 illustrate various implementations of food holders. The food holders may be modified in numerous manners. For example, the food holders may be ergonomically shaped or designed to be comfortable for a person wearing the food holder on their arm in a sporting event, such as a marathon. An ergonomically designed food holder can have one or more of rounded edges, a smooth surface, and a low profile such that repeated contact with the food holder against skin, such as one's side as might be expected during a marathon, will not scrape or irritate the skin. The food holders may be designed to be light weight by the choice of materials, such as by using light weight plastics that are suitable for contacting food. The food holders may also include, or be in the form of, a cylindrical tube to hold large nutritional or medical tablets, like the Nuun™ or SuperBites™ energy tablets or Zipfzz™ energy drink powders. The food holders may be modified, as seen in FIGS. 13-14, to accommodate cubes of differing shapes and sizes or cubes that are pre-wrapped in protective coating such as the XELR8® VitaCubes™.

The food holders also may be implemented for many different utilities or applications. For example, the food holder may be integrally formed with a gym or equipment bag, cooler, lunch box, tackle box, or tool box, or be attachable to one or more of these using any of the methods described herein. The base of the food holder may include a Velcro strip that mounts to a mating Velcro strip attached to the cooler, lunch box, tackle box, or tool box. The base may include a magnet and be attached to any metal item, such as a tool box. The food holder also may have a chamber in its base that allows it to float so that it can be used in a water-environment, such as for Naval personnel. For sports, recreational, and outdoor enthusiasts, the food holder can be shaped to fit discreetly with a sports item or apparel. Examples include: on or within the handle of a racket, on ski poles or hiking poles; on a visor of a cap; on a golf bag; on a water bottle; on a goggle case or lanyard; to the cord or pockets on a pair of swimming trunks; a beach shovel or net, beach chair; mountain climber gear; wrist guards, skates (both ice and inline skates), ski and snowboard boots and boards.

Many other applications are possible using the methods described herein. For example, the food holder can mount on a rail that is mounted to another article. The other article can be a wallet with a rail on a chain; personal or recreational electronic devices, gear or cases having a built-in rail; eyewear with a rail to mount the holder; on clothing articles, such as boots/shoes/sandals/belts/clothes, cargo pants/shorts, sweaters or jackets with the rails built into pockets/sleeves/wristband of item; keychains having a center pull ring to hold keys and outer canister that pulls off for holding the food cube; a key or chain fob that can be a single cube holder using a leather tear-drop shaped fob and for newer electronic fobs, a secret compartment; on a dog or cat leash, etc.

In addition to diabetics and pregnant mothers, the food holder also can be implemented for more medical applications like treating high blood pressure, anemia, and nicotine/addiction cessation, etc. The food holder can be implemented in a walking cane, walker, or wheelchair. The holder can be within an integrated compartment or built into a handle or along the sides. For example, the food holder can be mounted to a glucosometer used by diabetics to monitor their blood sugar levels. In this manner, if a diabetic uses the glucosometer and measures a low blood sugar level, the diabetic can conveniently open the food holder attached to the instrument and take one of the food substances to quickly correct the low blood sugar level. The food holder can also be mounted with, or contain, an internal alarm or signal to provide a reminder to take medications or supplements at particular times or at particular time or distance intervals.

The food holder can be implemented for medical purposes as part of a pill organizer or box. In this implementation the food holder is either a simple version with expanded sides and top for cubes, or dual purpose for pills and cubes with cubes being positioned underneath in a separate compartment. The pill organizer implementation can be rectangular or linear shaped and include a wipe-off menu to keep track of cubes or can have a pullout organizer to write on (e.g., holds 3"×5" menu cards).

The portable trays can be adapted to become a replacement for a lunchbox in order to incorporate nutrition needs. The device will then be a larger container with multiple trays that can be formed into a single unit, or separated or combined as desired. In natural crisis or emergency relief response situations, the trays can be utilized as an emergency resupply product with mechanisms to identify the time and date of tray contents for tracking consumption or freshness. The trays can also be used to replace meals where there is an essential need to reduce waste materials, such as aerospace missions, long range reconnaissance; or in general applications to minimize ecological impact of waste materials.

While several particular forms of the invention have been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention. For example, in some implementations, the food holders can be implemented using cloth or canvas with the spike on either a base section or a lid section. The base can have cloth side walls or a single circular wall and the lid attached to the base to form a hinge. The lid can be retained closed against the base using loops and hooks, a snap, etc.

In another implementation, the food holder can be mounted to a wearable badge, such as the access badge used in government and office buildings. The badge holder can have a portion on one side for retaining the access badge and the food holders can be mounted on the other side. The badge holder and the food holders can be fabricated as a single integral piece or assembled with the badge and food holders permanently affixed.

In another implementation, the food holder can be mounted to a bottle, can, or container as an independent item or as part of a larger device to carry the beverage. The carrier can be formed to fit under, over or around a bottle cap. The food holder can have an integrated replacement bottle cap that secures the trays to the bottle and serves as the seal or cover of the bottle. The food holder can also be formed with a loop or strap that will fasten around a can or container by means of stretching the loop or strap. The food holder can be fabricated into an exterior pouch that will carry a bottle or can of varying shapes and sizes, which can then be fastened to a person or article, or simply carried by a strap or around the waist. The food holder trays can be stacked or linked to make interconnecting arrangements similar to Lego® blocks.

In another implementation the food holder trays can be formed to hold prepackaged cubes, pellets, gum, candy, lozenges, or other items prepackaged in foil blister packs having a plastic sheet formed to create a plurality of cavities that each contains a single item. The single items are sealed and retained within each cavity by a thin foil layer, such that the items can be dispensed from the package by pressing the item through the foil. The edible items held in the food holder may be Aquafresh® Dental Gum or Aquafresh® Dental Lozenges. The food holder can be configured to display the images on the edible items such as the Flix® Candy Bubble Toons.

In another implementation the food holder trays can be formed into circular or non-linear arrangements that will hold prepackaged food items or individual items. The trays can be formed into round containers similar in size to a hockey puck and have a removable top allowing uninhibited consumption of the product therein. The food holder can contain a length of material with spikes or adhesive to secure the food items and the mounting material is wrapped in a spiral. The container functions like a tape dispenser allowing a person to remove a single item or multiple food items.

In another implementation of the food holder, trays can be formed into circular discs that can be mounted to the top or side of a watch or other device and contain a cylindrical center shaft upon which the trays can be rotated manually or through use of gears. The circular food tray can contain spikes or adhesive to mount the food items or the base plate device can contain a cylindrical shaft that extends from the flat surface and secures replacement prepackaged circular food trays, similar to placing a record on a base plate. The cylindrical shaft and the base plate can be contained within a circular housing element that approximates a fraction of the entire circumference of the circular food tray and thereby expose one or more food items to the user.

In another implementation, the food holder trays can be arranged in multiple rows of cylinders that contain an internal belt. The food items can be accessed at an opening as the belt is rotated by opening of the cylinders or turning of a knob or depressing of a lever.

Figure 15:
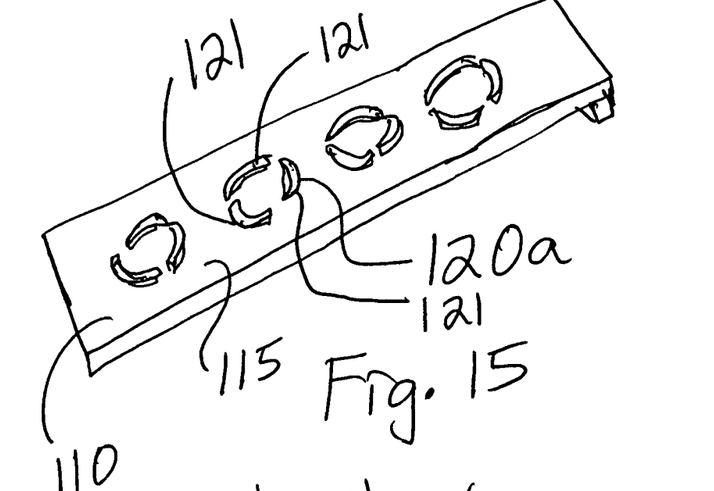
FIGS. 15 and 16 are perspective views of food retaining means to retain an article of food to the food holder.
Figure 16:
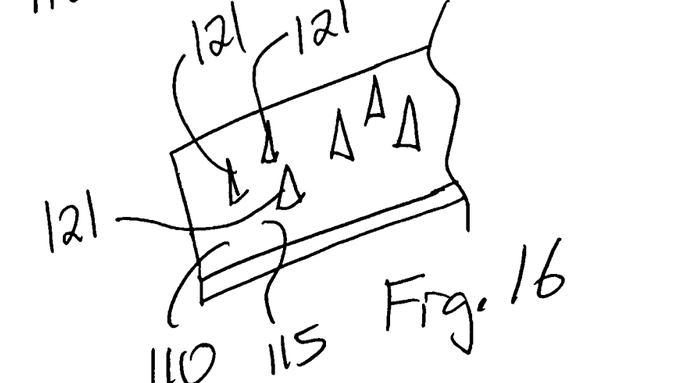

In another implementation, the spikes 120 can be configured as more than a long narrow spike that impales the food cube. For example, FIG. 15 illustrates the tray portion 110 of the wearable food holder 100. Rather than the prongs or spikes 120 being configured as a long, narrow spike, they are configured as a retaining means 120a that holds the food cubes by either impaling the cubes of creating an interference fit against the cubes. The retaining means 120a can be one or more 121 members that form an enclosure that receives the food cube. Alternatively, the retaining members can have a somewhat sharpened end against which the food cubes are partially impaled. FIG. 16 illustrates that the single spike can be replaced by multiple spikes 121 that are used to either impale the food cube or form an interference fit with the food cube. Accordingly, it is not intended that the invention be limited, except as by the appended claims.

What is claimed is:

1. A wearable food holder for containing a food article, the food holder comprising:
a container portion having multiple walls defining an interior volume into which a food article may be contained;
a tray portion, the tray portion being movable relative to the container portion from an enclosed position within the container portion to an open position outside of the container portion to access a food article from the interior volume of the container when the food article is removed from the interior volume of the container portion, wherein the tray portion is defined by a base surface having four sides and the base surface is within the container portion in the enclosed position and the base surface is outside of the container portion in the open position;
one or more spikes, the spikes extending from the base and being positioned within the interior volume of the container portion when the tray portion is in the enclosed position and configured to retain the food article to the tray portion, wherein the base from which the spike extends is free of any walls extending from the base on at least two opposite sides of the base enabling a user of the wearable food holder to have unobstructed access from at least two sides to a food article retained on the spike; and
a mounting means for mounting the food holder to an article for wearing by a person.

2. The wearable food holder of claim 1, wherein the one or more spikes extend from the container portion.

3. The wearable food holder of claim 1, wherein the one or more spikes extend from the tray portion.

4. The wearable food holder of claim 3, wherein one spike extends from the tray portion.

5. The wearable food holder of claim 1, wherein the container portion includes a pair of slots configured to receive the tray portion to mount the tray portion to the container portion.

6. The wearable food holder of claim 5, wherein the pair of slots on the container portion have a shape that mates with edges of the tray portion to allow the tray portion to slide into the container portion in only one orientation.

7. The wearable food holder of claim 1, wherein the tray portion is connected to the container portion with a hinge extending from one side of the base surface and two sides of the base adjacent to the hinge are each free of a wall extending from the two side of the base surface.

8. The wearable food holder of claim 1, wherein the mounting means comprises one or more openings configured to receive a strap or band.

9. The wearable food holder of claim 1, wherein the mounting means comprises a slotted channel formed by pair of edges that define a channel that can be accessed through a slot.

10. The wearable food holder of claim 1, wherein the mounting means comprises one or more of a clip, pin, hook and loop straps, a hook or loop section, or a round ball extending from the container portion to be forcibly inserted through a smaller hole in a band.

11. The wearable food holder of claim 1, wherein the food holder is worn on one or more of a wrist band, arm band, belt, or piece of clothing.

12. The wearable food holder of claim 1, further comprising an article of food being held in the food holder, the article of food comprising a food bar.

13. A method of carrying food in a wearable food holder, the method comprising:
providing a wearable food holder, the wearable food holder comprising a container portion, a tray portion, one or more spikes and a mounting means,
the container portion having multiple walls defining an interior volume,
the tray portion being defined by a base surface having four sides and movable relative to the container portion from an enclosed position in which the base surface is within the container portion to an open position in which the base surface is outside of the container portion, the one or more spikes extending from the base surface and the base surface from which the spikes extend being free of any walls extending from the base surface on at least two opposite sides of the base surface thereby enabling a user of the wearable food holder to have unobstructed access to the spikes from at least two sides, the base surface being positioned within the interior volume of the container portion when the tray portion is in the enclosed position, and the mounting means for mounting the food holder to an article for wearing by a person;

mounting a piece of food to the one or more spikes, wherein a user mounting a piece of food to the one or more spikes has unobstructed access to the spikes from at least two sides;

closing the food holder whereby the piece of food is retained within the interior volume; and attaching the wearable food holder to one or more of a band, strap, belt or piece of clothing using the mounting means.

14. The method of claim 13, wherein the one or more spikes extend from the container portion.

15. The method of claim 13, wherein the one or more spikes extend from the tray portion.

16. The method of claim 13, wherein the container portion includes a pair of slots configured to receive the tray portion to mount the tray portion to the container portion.

17. The method of claim 16, wherein the pair of slots on the container portion have a shape that mates with edges of the tray portion to allow the tray portion to slide into the container portion in only one orientation.

18. The method of claim 13, wherein the tray portion is connected to the container portion with a hinge extending from one side of the base surface and two sides of the base adjacent to the hinge are each free of a wall extending from the two side of the base surface.

19. The method of claim 13, wherein the mounting means comprises one or more openings configured to receive a strap or band.

20. The method of claim 13, wherein the mounting means comprises a slotted channel formed by pair of edges that define a channel that can be accessed through a slot.

21. The method of claim 13, wherein the mounting means comprises one or more of a clip, pin, hook and loop straps, a hook or loop section, or a round ball extending from the container portion to be forcibly inserted through a smaller hole in a band.

22. A wearable food holder, the food holder comprising:
a container portion having multiple walls defining an interior volume into which a food article may be contained;
a tray portion having a base surface having four sides, the tray portion being movable relative to the container portion from a closed position in which the base surface is within the container portion to an open position in which the base surface is outside of the container portion to provide access to the base surface, the tray portion being attached to the container portion by a hinge extending from one side of the base surface;
one or more retaining means, the retaining means extending from the base surface and being positioned within the interior volume of the container portion when the tray portion is in a closed position and being accessible from at least two sides when the tray portion is in an open position; and
a mounting means for mounting the food holder to an article for wearing by a person.

* * * * *